United States Patent [19]
Drake, Jr. et al.

[11] Patent Number: 5,658,430
[45] Date of Patent: Aug. 19, 1997

[54] CARPET OVER CARPET INSTALLATION ADHESIVE

[75] Inventors: Robert H. Drake, Jr., East Alton; Edward L. Herrin, Edwardsville, both of Ill.

[73] Assignee: Burlington Industries, Inc., Greensboro, N.C.

[21] Appl. No.: 560,124

[22] Filed: Nov. 17, 1995

[51] Int. Cl.⁶ .............................. E04B 2/00; E04F 13/00; B32B 3/02
[52] U.S. Cl. ................................ 156/71; 156/94; 428/86; 428/95
[58] Field of Search ............................ 156/71, 94; 428/95, 428/86

[56] References Cited

U.S. PATENT DOCUMENTS

| | | |
|---|---|---|
| 2,675,337 | 4/1954 | Walker et al. |
| 3,934,341 | 1/1976 | Carlson .................................. 30/287 |
| 4,361,610 | 11/1982 | Roth. |
| 4,557,774 | 12/1985 | Hoopengardner. |
| 4,647,484 | 3/1987 | Higgins. |
| 4,673,603 | 6/1987 | Roth. |
| 4,702,948 | 10/1987 | Sieber-Gadient. |
| 4,731,275 | 3/1988 | Andersen. |
| 4,758,457 | 7/1988 | Altus. |
| 4,762,741 | 8/1988 | Hedley. |
| 4,804,567 | 2/1989 | Reuben. |
| 4,822,658 | 4/1989 | Pacione. |
| 4,824,498 | 4/1989 | Goodwin et al. |
| 4,829,627 | 5/1989 | Altus et al. |
| 4,968,548 | 11/1990 | Gibson et al. |
| 5,082,705 | 1/1992 | Rose. |
| 5,160,770 | 11/1992 | Hoopengardner .................. 428/40 |
| 5,304,268 | 4/1994 | Hoopengardner .................. 156/90 |
| 5,380,574 | 1/1995 | Katoh et al. |

OTHER PUBLICATIONS

"Taking a Fresh Tack", Carpet & Floorcoverings Review, Sep. 25, 1992, p. 35.
"Roberts Padding is Introduced for Use with Glue Spray", Floor Covering Weekly/Contract, Oct. 14, 1995, pp. 12, 18.
Hollinden et al, "School Carpeting", AS&U, Feb. 1980, pp. 42, 44, 48.
"Guess Who's 'Bullish' on Carpet Tiles . . . ", Flooring, Nov., 1992, p. 32.
"Direct Gluedown Method . . . ", Floor Covering Weekly/Contract, Jan. 14, 1980.
"What You Need to Know About Flame Retardants . . . ", Plastics World, Sep. 1995, pp. 79–82.
Ellery, "Laying Carpets by Total Adhesion", Conference of the Textile Institute's Floorcoverings Group, Sep. 19–20, 1989.
Article from Carpet & Floorcoverings Review, May 15, 1992, "Siga Sets Sights on UK Market".

*Primary Examiner*—Terrel Morris
*Attorney, Agent, or Firm*—Nixon & Vanderhye P.C.

[57] ABSTRACT

New wall to wall carpeting is applied directly over worn broadloom or tile wall to wall carpeting having a backing secured to a hard floor surface (e.g. directly attached, such as by adhesive, to an existing concrete floor) and a top pile surface. The worn carpeting is cleaned and then a high molecular weight acrylic ester polymer emulsion adhesive is sprayed onto the top pile surface of the old carpet. The vinyl backing of one or more new carpet strips is applied directly to the adhesive. A fire retardant is preferably included with the adhesive or separately applied to the top pile surface of the old carpet. If desired the adhesive may be applied to only a small part of the old carpet for holding strips of hook fasteners, and the new carpet backing may include loop fasteners which cooperate with the hook fasteners and hold the new carpet in place.

17 Claims, 2 Drawing Sheets

FIG. 4
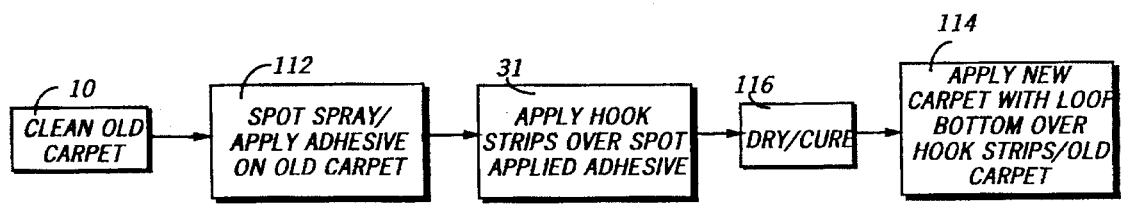
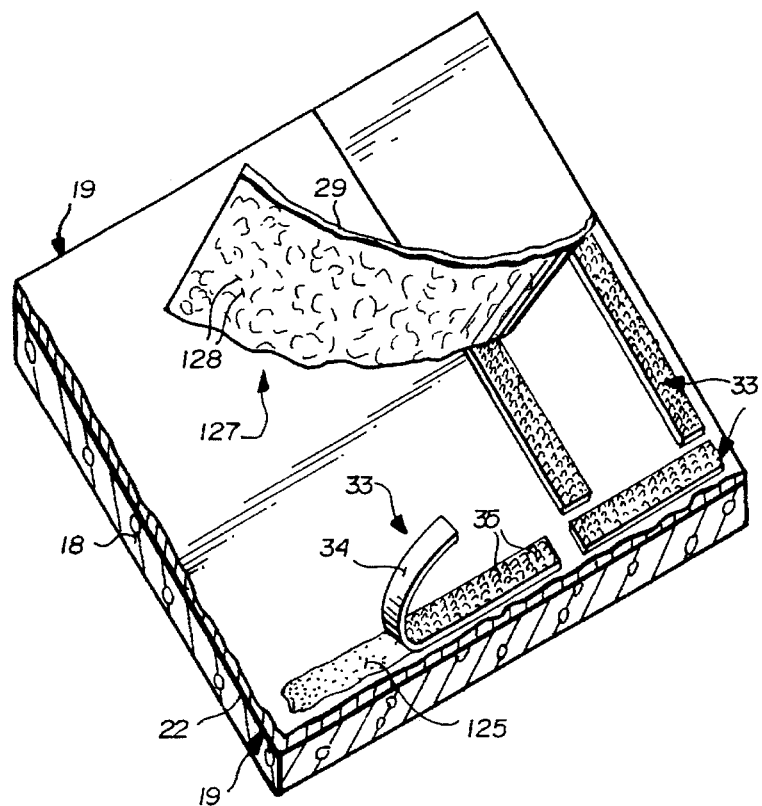
FIG. 5

CARPET OVER CARPET INSTALLATION ADHESIVE

BACKGROUND AND SUMMARY OF THE INVENTION

When wall to wall broadloom carpeting becomes worn, typically the carpeting is removed and new carpeting is put in its place. While this may be effective for conventional carpeting which is tacked down to existing or cooperating flooring, more difficulties may be encountered when the worn carpeting has been direct glued down such as described in an article in the Jan. 14, 1980 issue of Floor Covering Weekly entitled "Direct Glue Down Method Growing in Importance in Commercial Installations", and such as described in the Sep. 19, 1989 paper presented at TIFCON '89 by E. Ellery entitled "Laying Carpets by Total Adhesion", the disclosures of which are hereby incorporated by reference herein. However even with direct glued down existing carpeting removal is a typical procedure before the new carpeting is employed because it is very difficult to get new carpeting to properly adhere to the worn carpeting.

According to the present invention a method of installing new wall to wall carpeting—and flooring applied by that method—are provided which do not require removal of the existing worn wall to wall carpeting. According to the present invention it is possible to apply new carpeting directly over the worn carpeting.

As used in the present specification and claims "wall to wall carpeting" encompasses broadloom (typically in roll form), tile (i.e. carpet tiles), or other conventional wall to wall carpeting types.

According to one aspect of the present invention a method of installing new wall to wall carpeting at a location in which there is existing worn wall to wall carpeting having carpet pile facing upwardly, is provided. The method comprises the steps of: (a) Applying adhesive to at least the majority of the upwardly facing pile of the worn wall to wall carpeting. And, (b) applying new carpeting having a backing and pile by bringing the new carpet backing into contact with the adhesive, so that the adhesive serves at least in part to substantially permanently adhere the new carpeting to the worn carpeting. The method is made particularly feasible by practicing step (a) by spraying a high molecular weight acrylic ester polymer emulsion adhesive (such a sold by Burlington Industries, Inc. of Greensboro, N.C. under the trade name "PRIMER SEALER") onto the top pile surface of the old carpet. When installing new carpeting over existing carpeting, obtaining a Class I fire rating becomes more difficult. Therefore it is preferred that a fire retardant also be included in the adhesive that is applied over the worn carpeting prior to step (b). Application of the fire retardant preferably is accomplished by adding the fire retardant to the adhesive and spraying them on together.

Typically there is the desirable further step of cleaning the worn carpeting substantially immediately prior to the practice of step (a), not only for hygiene purposes but also to ensure a better bond between the adhesive and the backing of the new carpeting (which preferably is a vinyl backing such as is provided in THERMOBOND 6 carpeting available from Burlington). Cleaning may be practiced by vacuuming and/or shampooing or steam cleaning.

Typically the worn wall to wall carpeting, if broadloom, has a first width and step (b) is practiced by applying strips of carpeting each having a second width which is about half or less than the first width. Alternatively, if the worn carpeting is in the form of adhesively secured carpet tiles step (b) is most typically practiced by applying approximately six foot wide rolls of new carpeting, such as the Burlington THERMOBOND 6 product discussed above.

According to another aspect of the present invention a floor covering for a hard surface floor is provided comprising the following components: Worn broadloom or tile wall to wall carpeting having a backing and a top pile surface, with the backing of the worn carpeting secured to the floor hard surface; New wall to wall carpet having a backing and a top pile surface; And, adhesive covering at least the majority of the worn carpeting top pile surface for adhering the backing of the new carpet directly to the top pile surface of the worn carpet. Preferably there also is a flame retardant on at least the majority of the worn carpet top pile surface, of sufficient amount to obtain a Class I fire rating. As described above with respect to the method, the adhesive preferably comprises a high molecular weight acrylic ester polymer emulsion adhesive, and the fire retardant may be included in the adhesive. Desirably the new wall to wall carpeting comprises a plurality of strips of vinyl backed carpeting such as the Burlington THERMOBOND 6, in which case the strips of new carpeting are about six feet wide (and the worn broadloom wall to wall carpeting is at least about 12 feet wide while the carpet tiles are usually about 18 inches or 24 inches square). While the worn carpeting may be conventional carpeting applied by tacking, with or without padding, to the hard floor surface, the invention is particularly suitable for use with worn commercial carpeting that has been adhesively secured directly to the hard floor surface (or adhesively secured to padding that is adhesively secured directly to the hard floor surface).

Another embodiment of the invention may make use of the techniques of an existing commercial product which utilizes "TAC-FAST" tape. The TAC-FAST tape product, which is generally described in U.S. Pat. No. 4,822,658 (the disclosure of which is hereby incorporated by reference herein) includes a wall to wall carpet construction in which a tape having hook members (see 22 in FIG. 2 of U.S. Pat. No. 4,822,658) is applied to an existing hard floor surface (such as concrete), and then new carpeting 10 (see FIGS. 1 and 3 of U.S. Pat. No. 4,822,658) having downwardly facing loop members on the back side thereof is applied to the spaced tapes of hooks, the hooks and loops together providing a fastening system which securely holds the carpeting in place. However existing TAC-FAST tape does not adhere effectively to the pile surface of worn carpeting so that it is not possible to effectively hold the new carpeting in place. Existing TAC-FAST tape pulls loose around its edges after about 24 hours. Therefore according to another aspect of the present invention a method, and flooring, are provided in which the TAC-FAST system can be utilized over existing carpeting by spraying high molecular weight acrylic ester polymer emulsion adhesive onto the top pile surface of the worn carpeting using a tank sprayer, the adhesive being sprayed typically only to where the TAC-FAST tape will be applied, and after the adhesive sets up (dries or cures) the TAC-FAST is applied and the new carpeting is installed and is effectively held in place over the old carpeting since the TAC-FAST tape does not then come loose from the worn carpeting.

According to this aspect of the present invention a method of installing new wall to wall carpeting at a location in which there is existing worn wall to wall carpeting having carpet pile facing upwardly, comprises the steps of: (a) Applying adhesive to selected areas of the upwardly facing pile of the worn wall to wall carpeting at spaced locations thereon; (b) Applying first strips of a separable tape fastening material to the selected areas of adhesive, the strips comprising a backing and one of the fasteners of a separable hook and loop fastener system, with the backing applied to the adhesive; And, (c) applying new carpeting having a backing with the downwardly facing other member of the fasteners of a hook and loop separable fastener system, and a pile facing upwardly, by bringing the separable fastener member of the new carpet backing into contact with the surface of the tape fastener member of the hook and loop fastener system secured to the worn carpeting so that the hook and loop fastener elements interact to hold the new carpeting securely to the worn carpeting. The details of the adhesive, the use of flame retardant (either applied with the adhesive or applied over a majority of the worn carpet top pile surface), and the particular size of the new carpeting, are preferably as described in the first embodiment.

According to another aspect of the present invention a floor covering for a hard surface floor is provided comprising the following components: Worn broadloom or tile wall to wall carpeting having a backing and a top pile surface; The backing of the worn carpeting being secured to the floor hard surface; New wall to wall carpet having a backing with one type of fastener of a hook and loop fastener system, and a top pile surface; At least one strip of material having a backing and a top surface with the other fastener of a hook and loop fastener system for engaging the one fastener of a hook and loop fastener system in holding it in secure contact therewith; And, adhesive adhering the backing of the at least one strip of material directly to the top pile surface of the worn carpet. Typically the loop fastener component is mounted downwardly facing on the new carpet backing, while the hook fastener components are on the surface of the strips of material adhesively secured to the existing carpeting. The other details of the components are preferably as described above for the other embodiments.

It is the primary object of the present invention to provide for the effective, simple, less labor intensive, and advantageous installation of new wall to wall carpeting/flooring in areas where there is existing broadloom or tile wall to wall carpeting. This and other objects of the invention will become clear from an inspection of the description of the invention, and from the appended claims.

BRIEF DESCRIPTION OF THE DRAWINGS

FIG. 4 is a schematic like that of FIG. 1 for a second embodiment of the method according to the present invention; and FIG. 5 is a schematic like that of FIG. 2 only showing an application of new carpeting over existing carpeting according to the method of FIG. 4.

DETAILED DESCRIPTION OF THE DRAWINGS

Figure 1:
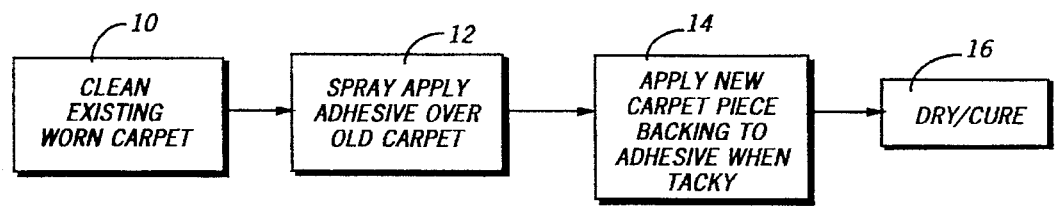
FIG. 1 is a schematic box diagram illustrating exemplary method steps that may be practiced according to a first aspect of the present invention.

FIG. 1 schematically illustrates the basic steps in the practice of a first embodiment of the method according to the present invention in the installation of new wall to wall carpeting. Existing worn carpeting is cleaned—as indicated at 10 in FIG. 1—in the preferred embodiment in order to ensure better practice of the other method steps, as well as providing more effective hygiene. The cleaning in step 10 may be accomplished in any conventional manner, such as by vacuuming and/or shampooing and/or steam cleaning.

Over the clean existing worn carpeting an adhesive is applied as illustrated by box 12 in FIG. 1. Preferably the adhesive is applied by spraying from a portable tank, although depending upon the particular type of adhesive and the environment of the existing worn carpet, other techniques for application may be utilized including rolling, brushing, or if the adhesive is in powder or other solid form by machine or hand spreading it. In the preferred embodiment according to the present invention the adhesive is a high molecular weight acrylic ester polymer emulsion adhesive, such as sold by Burlington Industries, Inc. of Greensboro, N.C. under the trade name "PRIMER SEALER". The typical composition of a preferred, exemplary version of this adhesive is: more than 30% high molecular weight acrylic ester polymer emulsion, from 0–0.03% hydrocolloid stabilizers (e.g. about 0.005–0.015%, preferably about 0.01%), about 0.5–2% inorganic hydroxyl salt (e.g. about 1%), 0–0.2% inorganic biocide treatments (e.g. about 0.01–0.09, preferably about 0.05%), about 1–3% organic gum resin (e.g. about 2%), 0–0.1% organic colorant (e.g. about 0.005–0.015, preferably about 0.01%), about 0.1–1% aqueous alcohol (e.g. about 0.5%), and the rest of the formulation—up to 100%—of inert and/or specialty use materials.

Preferably a flame retardant is applied over the existing carpeting at approximately the same time as, and preferably directly with (merely being added to), the adhesive. The flame retardant is supplied in sufficient quantity so that it is possible to obtain a Class I fire rating for the final installation, given the other materials existing or utilized. A wide variety of flame retardants that are readily commercially available may be added to the adhesive before spraying using a airless sprayer or the like such as alumina trihydrate ("ATH"), bromine or chlorine flame retardants enhanced by antimony oxides, in combination or alone (such as chlorinated paraffins, or brominated hydrocarbons such as DBDPO or TBBPA), zinc borate, magnesium hydroxide or magnesium carbonate, melamine phosphates and pyrophosphates, molybdenum trioxide or ammonium octamolybdate, tiaryl phosphate esters or other organophosphorus compounds, zinc oxide, or combinations or mixtures of the above. In one particular example, ATH (Alumina Trihydrate) flame retardant is utilized in an amount that is about 8% by volume of the preferred high molecular weight acrylic ester polymer emulsion adhesive described above.

After the practice of step 12 in FIG. 1, new carpeting is applied to the adhesive when the adhesive is tacky as indicated at 14, and after application of the carpeting the entire system is allowed to dry or cure as indicated at 16. Drying or curing may be facilitated by the application of heat or ventilation, depending upon the particular adhesive, or the drying or curing step may be quick enough that no significant time delay is necessary before utilizing the new carpeting.

Figure 2:
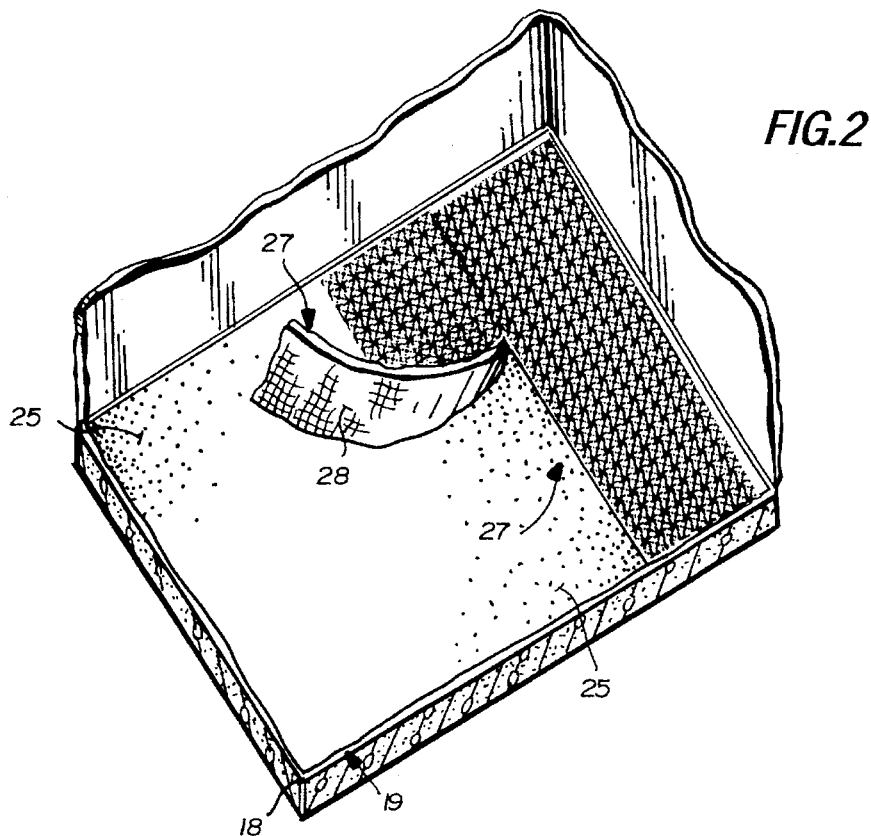
FIG. 2 is a top schematic perspective view showing installation of new carpeting over worn wall to wall carpeting in a room in a commercial building.
Figure 3:
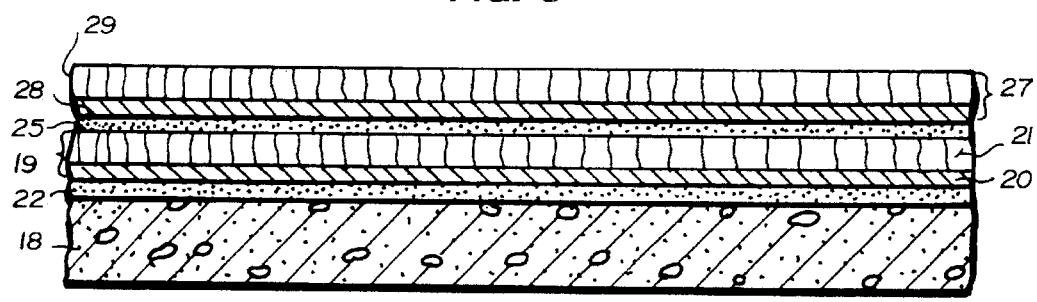
FIG. 3 is a side schematic cross-sectional view, with the size of some layers greatly exaggerated in size for clarity of illustration, of flooring according to the invention which is applied as illustrated and described with respect to FIGS. 1 and 2.

FIGS. 2 and 3 illustrate, respectively, the practice of the method of FIG. 1 utilizing particular materials, and the final flooring produced, respectively. In FIGS. 2 and 3 the existing hard surface floor is shown as a slab of concrete 18, but of course the flooring may be different, including plywood or other sub-flooring, slate, stone, or other hard rock-like material, or the like. The existing worn broadloom or tile wall to wall carpeting is shown generally by reference numeral 19 in FIGS. 2 and 3, and includes—as seen in FIG. 3—a backing 20 and a top pile surface 21. In the embodiment actually illustrated in FIG. 3 the existing worn carpeting 19 is shown adhesively secured, by conventional adhesive 22, directly to the concrete floor 18, although the invention is equally applicable to situations where the carpeting 19 is adhesively applied over padding, and the padding is applied by adhesive, or where the carpeting (with or without padding) is applied by conventional tacking techniques.

Both FIGS. 2 and 3 illustrate adhesive 25 which has been applied directly onto the top pile surface 21 of the worn carpeting 19. Preferably the adhesive is applied over the vast majority of the existing carpeting 19 (e.g. greater than 90% of the surface area thereof preferably about 100%), and typically at least a majority of the surface area thereof. The adhesive 25 is—as described above—preferably mixed with a flame retardant and sprayed on using an airless sprayer.

After the adhesive 25 has been sprayed on at least a particular area of the existing carpeting 19, the new carpeting—shown generally by reference 27 in FIGS. 2 and 3—is applied. The new carpeting 27 includes a backing 28 and a top pile surface 29. The backing 28 may be any suitable material, such as a vinyl backing as provided in the conventional Burlington THERMOBOND carpeting, and the backing 28 is applied over the adhesive 25 while the adhesive is still tacky. As schematically illustrated in FIG. 2 it is preferred that the new carpeting 27 be applied in strips which have a width which is about half or less of the width of the existing wall to wall carpeting 19 if broadloom. For example in the embodiment illustrated in FIG. 2 the carpeting 27 strips have a width of about six feet, which is the conventional width for rolls of commercial carpeting such as the Burlington THERMOBOND 6.

In the embodiment of FIGS. 4 and 5 the new carpeting is applied over the existing carpeting utilizing the basic techniques and components such as illustrated in U.S. Pat. No. 4,822,658 and such as sold commercially under the trade name "TAC-FAST". In the FIGS. 4 and 5 embodiment components or steps that are the same as those in the FIGS. 1 through 3 embodiment are shown by the same reference numeral, while components or steps that are similar but not identical are shown by the same reference numeral only preceded by a "1".

As illustrated in FIG. 4, in the box 112 the adhesive is spot or strip applied to selected surface areas of the existing carpeting 19 rather than applied over the entire surface area (or a majority of the area) thereof. FIG. 5 illustrates adhesive 125 applied in a generally rectangular configuration that corresponds to that of a hook strip 33 with which it will be utilized. After the adhesive is spot applied, hook strips 33 are applied over the spot applied adhesive as illustrated at 31 in FIG. 4. Then after drying or curing 116 (if necessary), the new carpeting 127 is applied as indicated at 114 and as shown in FIG. 5.

The new carpeting 127 has a pile top surface 29 and the backing 128 preferably includes a downwardly facing raised loop tricot fabric which is adhesively affixed to the bottom side of conventional carpeting or otherwise is provided with the backing 128 (as illustrated in FIGS. 1 and 3 of the U.S. Pat. No. 4,822,658 patent). The strips 33 (such as illustrated in FIG. 2 of the U.S. Pat. No. 4,822,658 patent) include a backing 34 (which typically has its own adhesive applied thereto in the conventional TAC-FAST product), with hook fasteners 35 extending upwardly from the top face thereof, the hook fasteners 35 cooperating with the loop fasteners of the backing 128 to form a separable fastener which securely holds the carpeting 127 in place. The carpeting 127 preferably is also applied in six foot wide strips or the like, as described above with respect to the FIGS. 1 through 3 embodiment. Flame retardant is also preferably used in this embodiment at least in the adhesive areas 125, and if necessary to achieve a Class I fire rating is sprayed over at least the majority of the area of the existing broadloom or tile wall to wall carpeting 19.

It will thus be seen that according to the present invention two different embodiments of methods, and floorings, are provided according to the present invention which include the cost effectiveness, low labor intensiveness, and other advantages of application of new wall to wall carpeting over existing wall to wall carpeting. While the invention has been herein shown and described in what is presently conceived to be the most practical and preferred embodiments thereof it will be apparent to those of ordinary skill in the art that many modifications may be made thereof within the scope of the invention, which scope is to be accorded the broadest interpretation of the appended claims so as to encompass all equivalent methods and products.

What is claimed is:

1. A method of installing new wall to wall carpeting at a location in which there is existing worn wall to wall carpeting having carpet pile facing upwardly, comprising the steps of:
   (a) directly applying adhesive to at least a majority of the upwardly facing pile of the worn wall to wall carpeting; and
   (b) applying new carpeting having a backing and pile by bringing the new carpet backing into contact with the adhesive applied in step (a), so that the adhesive serves at least in part to substantially permanently adhere the new carpeting to the worn carpeting.

2. A method as recited in claim 1 comprising the further step of cleaning the worn carpeting substantially immediately prior to step (a).

3. A method as recited in claim 1 wherein the worn carpeting has a first width, and wherein step (b) is practiced by applying strips of carpeting each having a second width which is about half or less than the first width.

4. A method as recited in claim 3 wherein step (b) is practiced by applying approximately six foot wide rolls of new carpeting.

5. A method as recited in claim 1 wherein step (a) is practiced by spraying a high molecular weight acrylic ester polymer emulsion adhesive onto the top pile surface of the worn carpeting.

6. A method as recited in claim 5 wherein step (b) is practiced by applying one or more carpet strips having a vinyl backing over the adhesive so that the vinyl backing comes into contact with the adhesive.

7. A method as recited in claim 1 comprising the further step of (c) applying a flame retardant to at least a majority of the top pile surface of the old carpet prior to the practice of step (b).

8. A method as recited in claim 7 wherein steps (a) and (c) are practiced simultaneously by spraying a combination of adhesive and sufficient fire retardant to obtain a Class I fire rating.

9. A method of installing new wall to wall carpeting at a location in which there is existing worn wall to wall carpeting having carpet pile facing upwardly, comprising the steps of:

(a) applying adhesive to at least a majority of the upwardly facing pile of the worn wall to wall carpeting; and (b) applying new carpeting having a backing and pile by bringing the new carpet backing into contact with adhesive, so that the adhesive serves at least in part to substantially permanently adhere the new carpeting to the worn carpeting; and wherein step (a) is practiced by spraying a high molecular weight acrylic ester polymer emulsion adhesive onto the top pile surface of the worn carpeting.

10. A method as recited in claim 9 wherein step (b) is practiced by applying one or more carpet strips having a vinyl backing over the adhesive so that the vinyl backing comes into contact with the adhesive.

11. A method as recited in claim 9 comprising the further step of cleaning the worn carpeting substantially immediately prior to step (a).

12. A method as recited in claim 9 wherein the worn carpeting has a first width, and wherein step (b) is practiced by applying strips of carpeting each having a second width which is about half or less than the first width.

13. A method as recited in claim 12 wherein step (b) is practiced by applying approximately six foot wide rolls of new carpeting.

14. A method of installing new wall to wall carpeting at a location in which there is existing worn wall to wall carpeting having carpet pile facing upwardly, comprising the steps of:

(a) applying adhesive to at least a majority of the upwardly facing pile of the worn wall to wall carpeting; and (b) applying new carpeting having a backing and pile by bringing the new carpet backing into contact with adhesive, so that the adhesive serves at least in part to substantially permanently adhere the new carpeting to the worn carpeting; and (c) applying a flame retardant to at least a majority of the top pile surface of the old carpet prior to the practice of step (b).

15. A method as recited in claim 14 wherein steps (a) and (c) are practiced simultaneously by spraying a combination of adhesive and sufficient fire retardant to obtain a Class I fire rating.

16. A method as recited in claim 14 comprising the further step of cleaning the worn carpeting substantially immediately prior to step (a).

17. A method as recited in claim 14 wherein the worn carpeting has a first width, and wherein step (b) is practiced by applying strips of carpeting each having a second width which is about half or less than the first width.

* * * * *